United States Patent
Zhang et al.

(10) Patent No.: US 11,429,877 B2
(45) Date of Patent: Aug. 30, 2022

(54) UNIFIED LOGGING OF ACTIONS FOR LABELING

(71) Applicant: Microsoft Technology Licensing, LLC, Redmond, WA (US)

(72) Inventors: Hang Zhang, Campbell, CA (US); Girish Kathalagiri Somashekariah, Santa Clara, CA (US); Nadia Fawaz, Sunnyvale, CA (US); Caleb T. Johnson, Village of Lakewood, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 737 days.

(21) Appl. No.: 16/450,206

(22) Filed: Jun. 24, 2019

(65) Prior Publication Data

US 2020/0401911 A1   Dec. 24, 2020

(51) Int. Cl.
*G06F 9/44* (2018.01)
*G06N 5/02* (2006.01)
*G06K 9/62* (2022.01)
*G06F 9/451* (2018.01)
*G06F 16/17* (2019.01)

(52) U.S. Cl.
CPC ............. *G06N 5/025* (2013.01); *G06F 9/452* (2018.02); *G06F 16/1734* (2019.01); *G06K 9/6201* (2013.01); *G06K 9/6256* (2013.01)

(58) Field of Classification Search
CPC ....................................................... G06N 5/025
USPC ........................................................... 706/46
See application file for complete search history.

(56) References Cited

U.S. PATENT DOCUMENTS

| 10,936,585 | B1 * | 3/2021 | Echeverria ............. G05B 13/00 |
| 2017/0214648 | A1 * | 7/2017 | Shapiro .................... H04W 4/21 |
| 2020/0136889 | A1 * | 4/2020 | Chen ........................ H04L 41/06 |

* cited by examiner

*Primary Examiner* — Timothy A Mudrick
(74) *Attorney, Agent, or Firm* — Schwegman Lundberg & Woessner, P.A.

(57) ABSTRACT

The disclosed embodiments provide a system for processing data. During operation, the system receives, over a set of event streams, a set of logging events for actions performed between members and jobs over multiple channels. Next, the system aggregates a subset of the logging events spanning a logging window by a reference identifier (ID) generated based on a user session of a member, a first member ID for the member, and a first job ID for a job. The system then creates, based on a unified data logic, a record containing a subset of the actions represented by the logging events and contexts for the subset of the actions. Finally, the system outputs the record for use in subsequent analysis associated with the member and the job.

20 Claims, 5 Drawing Sheets

UNIFIED LOGGING OF ACTIONS FOR LABELING

BACKGROUND

Field

The disclosed embodiments relate to logging of data. More specifically, the disclosed embodiments relate to techniques for performing unified logging of actions for labeling.

Related Art

Analytics is commonly used to discover trends, patterns, relationships, and/or other attributes related to large sets of complex, interconnected, and/or multidimensional data. In turn, the discovered information is used to derive insights and/or guide decisions or actions related to the data. For example, business analytics may be used to assess past performance, guide business planning, and/or identify actions that may improve future performance.

To glean such insights, large datasets of features are analyzed using regression models, artificial neural networks, support vector machines, decision trees, naïve Bayes classifiers, and/or other types of machine learning models. The discovered information can then be used to guide decisions and/or perform actions related to the data. For example, the output of a machine learning model is used to guide marketing decisions, assess risk, detect fraud, predict behavior, and/or customize or optimize use of an application or website.

However, significant increases in the size of data sets have resulted in difficulties associated with collecting, storing, managing, transferring, sharing, analyzing, and/or visualizing the data in a timely manner. For example, conventional software tools, relational databases, and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers.

In addition, complex data processing flows and entity lifecycles involve numerous interconnected services, pipelines, channels, inputs, and outputs, which can be difficult to coordinate or track in a consistent and/or uniform manner. For example, an online system delivers advertisements, posts, jobs, and/or other content over multiple channels and/or platforms, such as mobile applications, web applications, native applications, emails, search modules, home pages, recommendation modules, notification mechanisms, partnerships, search engine optimization, and/or app stores. Each channel and/or platform includes backend components that generate the content and/or frontend components that output the content to users. After a given content item is outputted to a user over a channel and/or platform, the user's response to the content item (e.g., click, view, ignore, reject, etc.) is recorded, and the response is used to customize the generation and/or delivery of subsequent content to the user and/or similar users.

Continuing with the above example, some channels, such as marketing or recommendation emails, are associated with a significant delay (e.g., days or weeks) between delivery of the content and the receipt of responses (e.g., clicks, views, etc.) to the content. Other channels, such as modules in an online system, output the content to users as the users interact with the online system, and thus receive responses to the content with much less latency. As a result, a tracking system that tracks the delivery of content and/or responses to the content over one channel may be incompatible with another channel that uses a different delivery mechanism. Instead, multiple tracking systems are developed to track and/or collect responses (e.g., for subsequent use with analytics and/or models) over the various channels. Because the tracking systems are independently designed and/or developed, each tracking system uses a different set of identifiers and/or attributes to generate tracking records. In addition, some tracking systems can include bugs and/or corner cases that cause some tracking records to include missing or erroneous identifiers and/or attributes.

Consequently, big data analytics may be facilitated by mechanisms for efficiently collecting, storing, managing, compressing, transferring, sharing, analyzing, processing, defining, standardizing, and/or visualizing large datasets.

BRIEF DESCRIPTION OF THE FIGURES

In the figures, like reference numerals refer to the same figure elements.

DETAILED DESCRIPTION

Figure 1:
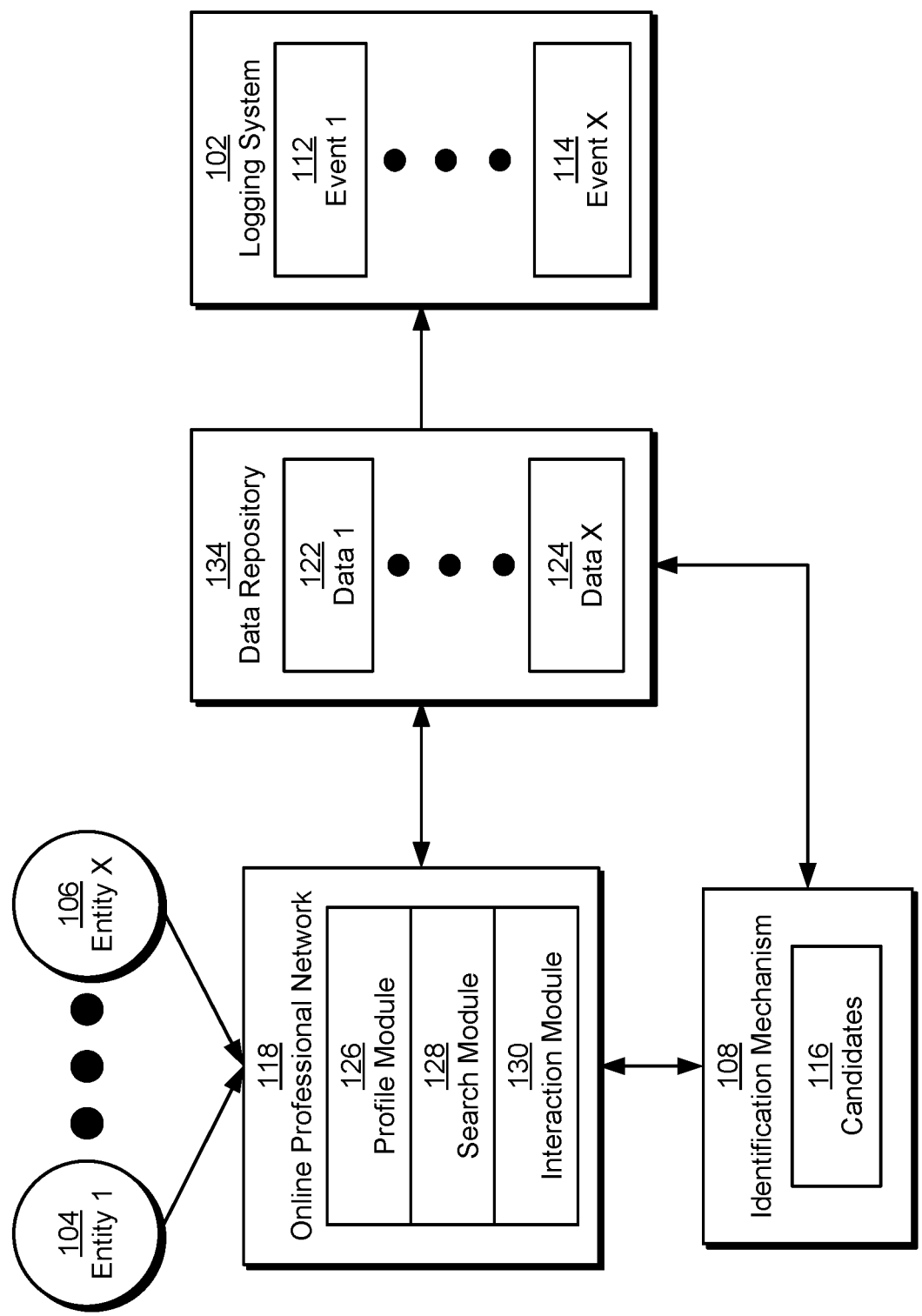
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for generating logging data. The logging data includes events or records for actions related to jobs. For example, the actions include, but are not limited to, job views, clicks, saves, dismisses, likes, unlikes, applications, and/or referral requests. The actions are generated and/or received over one or more platforms and/or channels, such as email, mobile, web, job search, job recommendation, "jobs homepage," and/or job listing channels in an online system.

More specifically, the disclosed embodiments provide a method, apparatus, and system for performing unified logging of job-related actions for subsequent use with labeling, analytics, and/or modeling. In these embodiments, unified logging includes generating a uniform and/or standardized representation of fields in events for job-related actions across multiple channels. A reference ID is generated for a given user session and/or period of user interaction involving one or more job-related actions. The reference ID is subsequently included in an event that logs each job-related action that occurs within the user session. Each event additionally includes a member ID of a member performing the corresponding action, a job ID of a job to which the action applies, and/or attributes that describe the context in which the action was made (e.g., timestamp, device, platform, channel, etc.).

The reference ID, member ID, and/or job ID are subsequently used to aggregate and/or join events for actions related to the same user, job, and/or period of user interaction. For example, a reference ID, member ID, and job ID are assigned to an event for the first action between a user with the member ID and a job with the job ID after the job is returned in response to a job query involving the user (e.g., performed by the user or on behalf of the user). The same reference ID, member ID, and job ID are also assigned to events for subsequent actions between the same user and job originating from the same query, even if some or all of the subsequent actions occur over other user sessions and/or are generated or received over other channels or platforms. If the member ID and job ID are found in an event for a second action that is generated as a result of a new query (e.g., a job search with different search parameters that returns the same job to the same user), a different reference ID is generated for the second action and assigned to events for subsequent actions between the user and job that originate from the new query. Each combination of a given reference ID, member ID, and job ID is then used to aggregate the events for the user, job, and query into a single "unified" record representing the user's "history" of interaction with the job over a logging window (e.g., a number of days).

The disclosed embodiments also include functionality to standardize and/or infer some or all fields in the events before aggregating the events into the unified record. For example, a missing reference ID in an event is handled by generating a reference ID for the event and assigning the reference ID to the event and/or additional events that span the same time window. In another example, a non-standardized or ad hoc channel name in an event is convert into a standardized channel name using a set of matching rules, and the standardized channel name is included in the corresponding unified record as part of the context for the action in the event.

By aggregating events that log actions by common reference IDs, member IDs, and job IDs, the disclosed embodiments generate unified records that characterize the "histories" of actions between individual members and individual jobs across different channels, platforms, and/or times. The disclosed embodiments additionally include functionality to handle missing reference IDs in the events, which allows unified logging to be applied to corner cases and/or bugs that cause logging or tracking issues in individual channels. The disclosed embodiments further use a unified data logic to generate and/or standardize fields in the unified records, which allows the unified records and/or actions in the records to be filtered and/or analyzed with respect to the fields.

Moreover, the unified records can be used to generate comprehensive training data for machine learning models that generate predictions or inferences related to the members and jobs. Because the machine learning models are created using feature sets representing the histories of interactions between members and jobs across channels and time, the machine learning models have higher performance than conventional machine learning models that are trained using limited and/or incomplete data from individual channels. The disclosed embodiments additionally reduce manual overhead and/or resource (e.g., processor, memory, storage, etc.) consumption over conventional techniques that require manual aggregation of data into machine learning feature sets and/or multiple rounds of model training, testing, and/or validation using training data generated from different sets and/or combinations of events to achieve sufficient performance.

Consequently, the disclosed embodiments improve computer systems, applications, user experiences, tools, and/or technologies related to tracking, logging, user recommendations, analytics, feature engineering, machine learning, delivering content, hiring, employment, and/or job-seeking.

Unified Logging of Actions for Labeling

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may track or log searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 is inputted into the machine learning model(s), along with features and/or characteristics of the corresponding opportunities (e.g., required or desired skills, education, experience, industry, title, etc.). In turn, the machine learning model(s) output scores representing the strengths of candidates 116 with respect to the opportunities and/or qualifications related to the opportunities (e.g., skills, current position, previous positions, overall qualifications, etc.). For example, the machine learning model(s) generate scores based on similarities between the candidates' profile data with online network 118 and descriptions of the opportunities. The model(s) further adjust the scores based on social and/or other validation of the candidates' profile data (e.g., endorsements of skills, recommendations, accomplishments, awards, patents, publications, reputation scores, etc.). The rankings are then generated by ordering candidates 116 by descending score.

In turn, rankings based on the scores and/or associated insights improve the quality of candidates 116, recommendations of opportunities to candidates 116, and/or recommendations of candidates 116 for opportunities. Such rankings also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 display and/or otherwise output a member's position (e.g., top 10%, top 20 out of 138, etc.) in a ranking of candidates for a job to encourage the member to apply for jobs in which the member is highly ranked. In a second example, the component(s) account for a candidate's relative position in rankings for a set of jobs during ordering of the jobs as search results in response to a job search by the candidate. In a third example, the component(s) output a ranking of candidates for a given set of job qualifications as search results to a recruiter after the recruiter performs a search with the job qualifications included as parameters of the search. In a fourth example, the component(s) recommend jobs to a candidate based on the predicted relevance or attractiveness of the jobs to the candidate and/or the candidate's likelihood of applying to the jobs.

In one or more embodiments, a logging system 102 executing within and/or in conjunction with online network 118 performs unified logging of actions related to candidates 116, jobs, moderators, and/or other entities involved in hiring, employment, recruiting, and/or job-seeking. In particular, logging system 102 generates logging events (e.g., event 1 112, event x 114) that identify and/or characterize actions, members (e.g., candidates 116, moderators, etc.) involved in the actions, jobs involved in the actions, and/or contexts of the actions. As described in further detail below, online network 118 and/or logging system 102 aggregate the events into unified and/or standardized "histories" of actions between members and jobs, which improves subsequent analysis and/or use of data in the events.

Figure 2:
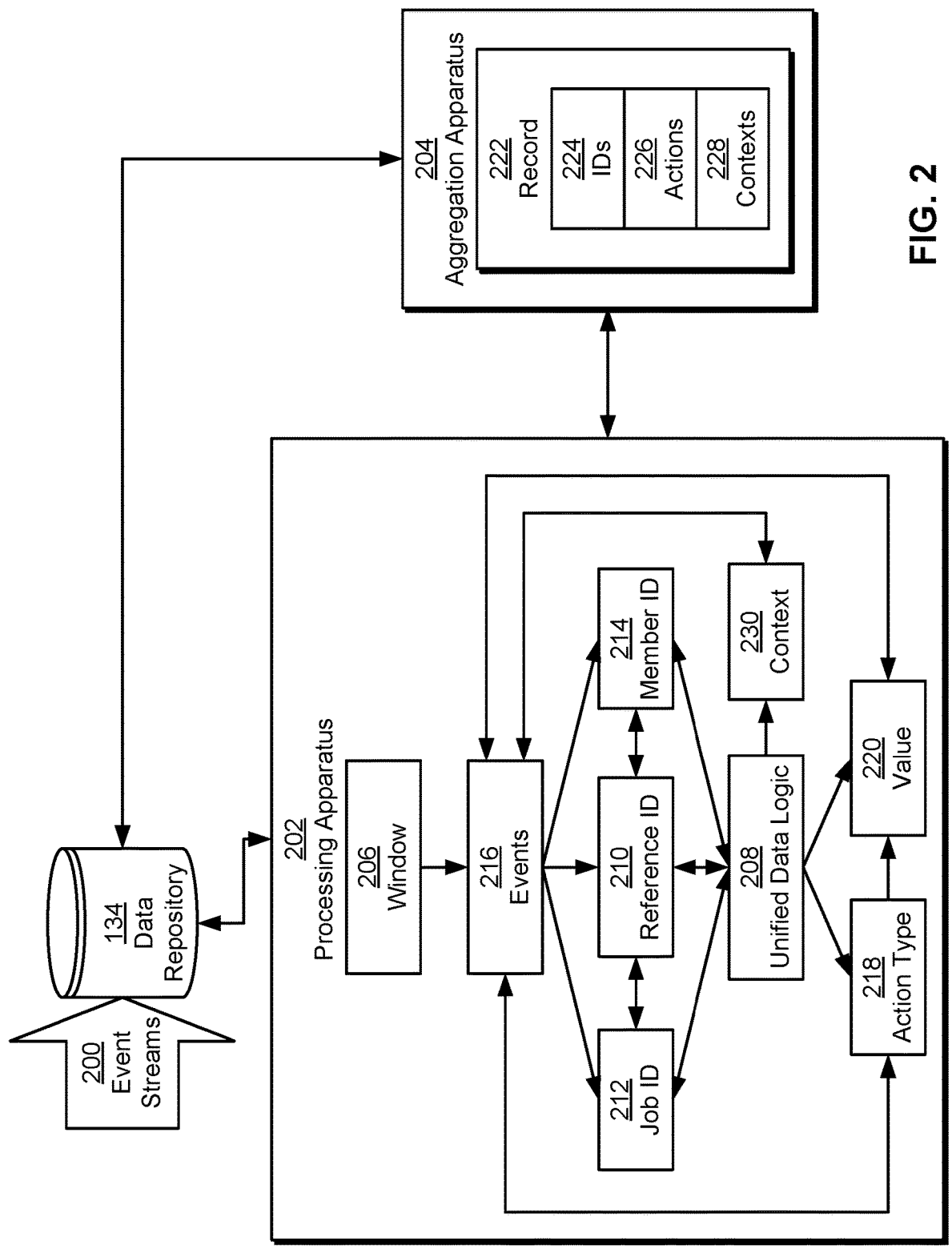
FIG. 2 shows a system for processing data in accordance with the disclosed embodiments.

FIG. 2 shows a system for processing data in accordance with the disclosed embodiments. As shown in FIG. 2, the system includes a processing apparatus 202 and an aggregation apparatus 204. Each of these components is described in further detail below.

Processing apparatus 202 receives events 216 from a data repository 134 and/or a set of event streams 200. Each event represents a record or log of one or more loads, views, clicks, likes, dislikes, searches, requests, responses, renders, interactions, and/or other activity within an online system, such as online network 118 of FIG. 1.

In one or more embodiments, event streams 200 are generated and/or maintained using a distributed streaming platform such as Apache Kafka (Kafka™ is a registered trademark of the Apache Software Foundation). For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis. The record is also, or instead, collected from event streams 220 and stored in a relational database, distributed filesystem, flat file, and/or another type of data store providing data repository 134.

In some embodiments, events 216 are generated by separate tracking or logging components in the online system. For example, events 216 for job-related actions (e.g., actions 226) are generated by frontend, middle tier, and/or backend components of various channels used to deliver jobs to members of the online system. The channels include, but are not limited to, a content feed channel that delivers posts, updates, articles, comments, and/or other content in the online system to the members; a job search channel that allows the members to search for jobs; a jobs home page channel that provides a landing page for job-related content; and/or a job detail channel that provides details related to a specific job. The channels also, or instead, include a job recommendation channel that delivers jobs that are determined to be relevant to a member's career interests, profile data, and/or previous job-related activity; an email channel that delivers email notifications and/or recommendations based on activity and/or subscription preference associated with other channels; a company page that displays jobs and/or other information related to a company; and/or a notification channel that delivers notifications related to jobs, connections, updates, and/or other activity or content within the online system.

More specifically, processing apparatus 202 analyzes and/or processes events 216 based on a time-based window 206. During such analysis and/or processing, processing apparatus 202 ensures that fields in events 216 conform to a unified data logic 208. Processing apparatus 202 also, or instead, generates and/or substitutes values of a field based on unified data logic 208.

Unified data logic 208 includes a schema associated with data in events 216. The schema include a reference identifier (ID) 210, job ID 212, and/or member ID 214 associated with each event. The schema also includes an action type 218 for each action that is tracked in a corresponding event and a context 230 of the action.

Job ID 212 includes a unique ID for a job in the online system, and member ID 214 includes a unique ID for a member in the online system. For example, job ID 212 and member ID 214 are monotonically increasing numeric IDs that are respectively assigned to members and jobs in the online system. When a new member (or job) is added to the online system, the "next available" member ID 214 (or job ID 212) (e.g., a numeric ID that is one higher than the last most recent member ID) is assigned to the member, and a counter that tracks the next available member ID (or job ID) is incremented.

Action type 218 includes an enumerated and/or standardized type of action between a member and a job. An event that specifies a given member ID 214 for a member, job ID 212 for a job, and action type 218 for an action thus indicates that the action was performed between the member and job.

For example, action type 218 includes a serve action that represents serving of a job for a member by a backend component. Action type 218 also, or instead, includes a viewport display action that represents displaying of a job within a viewport of the online system. Action type 218 also, or instead, includes a view action that represents clicking of the job within the viewport. Action type 218 also, or instead, includes a save action that represents saving of a job by the member (e.g., to a list for subsequent retrieval and/or consideration by the member) and/or an unsave action that represents removal of a saved job by the member. Action type 218 also, or instead, includes a report action that represents reporting of a job (e.g., as a fake job, spam, for inappropriate content, etc.) by the member. Action type 218 also, or instead, includes a share action that represents sharing of the job by the member (e.g., as a post, with other members of the online system, etc.). Action type 218 also, or instead, includes a dismiss action that represents dismissal of the job by the member (e.g., due to lack of relevance to the member or interest in the job by the member). Action type 218 also, or instead, includes a referral request that represents a request from a first member to a second member to refer the first member to the job. Action type 218 also, or instead, includes a like action that represents the member's interest in the job and/or an unlike action that represents the member's lack of interest in the job.

Action type 218 also, or instead, include one or more actions related to applications for jobs. For example, action type 218 represents a member's click on a job application that is hosted onsite within the online system (e.g., in a jobs module or feature). Action type 218 also, or instead, represents the member's click on a job application that is hosted offsite (e.g., on a "careers" page on a company's external website). Action type 218 also, or instead, represents a member's submission of an application to the job (e.g., after starting an onsite job application process).

Context 230 includes fields that describe the environment and/or setting in which a corresponding action was performed. For example, context 230 includes a timestamp of the action, a device type of the device used to perform the action (e.g., phone, tablet, computer, etc.), a device model of the device (e.g., a make and model of a phone or tablet), and/or a "user-agent" header field in a Hypertext Transfer Protocol (HTTP) request associated with the action. Context 230 also, or instead, includes a platform used to perform the action (e.g., the type and/or version of the application used to access the online system) and/or a channel associated with the action (e.g., content feed, job search, jobs home page, job recommendation, company page, email, notification, etc). Context 230 also, or instead, includes a display context that describes the appearance and/or location of the job when the action was performed. The display context includes a module ID of a module in which the job was shown, the position of the module in a user interface, and/or the position of the job in the module or user interface (e.g., the job's coordinates in the user interface and/or the job's position in a ranking shown within the module).

Reference ID 210 serves as a "tracking ID" or "logging ID" for job-related actions in the online system. As actions between members and jobs are generated and/or triggered, components of the corresponding channels in the online system call an application-programming interface (API) associated with and/or provided by the system of FIG. 2 to receive reference IDs for the actions. For example, a component submits a request to the API for one or more jobs to be delivered to a member (e.g., in response to the member performing a job search, navigating to a job-related module, clicking on an email, receiving a job-related notification, etc.). The API responds to the request with the corresponding job information (e.g., job IDs, titles, companies, seniorities, salaries, descriptions, requirements, etc.), along with a unique reference ID 210 for the job(s). The API also, or instead, generates one or more events for the action(s) represented by the request, includes reference ID 210 in the event(s), and transmits the event(s) over one or more event streams 220.

In some embodiments, reference ID 210 identifies one or more jobs associated with a user session and/or other period of interaction with a member. For example, a unique reference ID 210 is generated the first time a member interacts with one or more jobs within a given user session, channel, and/or query (e.g., a job search). The first interaction includes, but is not limited to, delivering a set of jobs in response to a job search by the member, displaying one or more jobs to the member within a viewport, and/or transmission of an email containing one or more jobs to the member. As the member continues performing and/or triggering actions with jobs in the context of the same user session, channel, and/or query, the same reference ID 210 is assigned to events 216 for the actions (e.g., by the API used to generate reference ID 210 and/or components of the channel).

After reference ID 210 is assigned to a given member and job, reference ID 210 is reused with subsequent interactions between the member and job within window 206. For example, frontend and/or backend components of job channels in the online system pass reference ID 210 among one another after reference ID 210 is generated for a given member ID-job ID pair and/or context of interaction related to the member ID-job ID pair. The components also, or instead, transmit requests to the API used to generate the original reference ID 210. Each request includes a timestamp, member ID 214, and job ID 212. If the API already has a generated reference ID 210 for a previous event with the same member ID 214 and job ID 212 and window 206 has not lapsed, the API generates a response to the request that includes the same reference ID 210 and/or includes reference ID 210 in an event for the corresponding action.

In some embodiments, window 206 includes a time interval (e.g., a number of days or weeks) over which events 216 associated with the same "series" of interactions between the member and job are aggregated or joined. For example, window 206 represents a maximum duration between delivery of an email containing one or more jobs to the member and the member's response (e.g., clicking one or more jobs in the email, ignoring the email, etc.) to the jobs. When the email is generated or delivered to the member, a new reference ID 210 is assigned to jobs in the email. If the member clicks on one or more jobs in the email within window 206 after the email's delivery time, the same reference ID 210 is assigned to those actions so that events for the actions can be aggregated with the event for delivery of the email to the member.

In another example, different types of actions are associated with different time-based logging or tracking windows. Actions related to serving, viewport display, viewing, saving or unsaying, dismissing, and/or applying to jobs in the online system have a shorter window 206 (e.g., three days), actions related to clicks or views of jobs in emails have a longer window 206 (e.g., seven days), and actions related to interactions between a member that has applied to a job and a moderator (e.g., recruiter, hiring manager, etc.) for the job have an even longer window 206 (e.g., a number of weeks).

In one or more embodiments, unified data logic 208 and/or processing apparatus 202 include rules, commands, and/or routines for transforming or standardizing some or all fields in events 216. First, unified data logic 208 and/or processing apparatus 202 include functionality to handle missing (e.g., null) reference IDs in events 216. Such missing reference IDs can be caused by bugs in components that generate events 216. Missing reference IDs can also, or instead, be caused by non-standard mechanisms for accessing jobs in the online system, such as clicking on links to the jobs in search results generated by external search engines and/or clicking on links to the jobs in posts displayed in a non-job-related content feed in the online system.

When processing apparatus 202 encounters a missing reference ID 210 in an event for a first action involving a member and a job (e.g., the first time the member views the job), processing apparatus 202 generates a new reference ID 210 for the event and assigns the generated reference ID 210 to the event. Processing apparatus 202 also assigns the same reference ID 210 to subsequent events 216 with the same member ID 214 and job ID 212 within window 206.

Second, unified data logic 208 and/or processing apparatus 202 include functionality to standardize channel names of channels in context 230. In some embodiments, different types of job-related emails are generated in response to different actions and/or triggers on different channels. One type of email includes periodic job recommendations for a member that is identified to be an active job-seeker, has recently accessed the jobs home page channel, and/or has recently interacted with a job recommendation channel. Another type of email includes new jobs that match a member's recent job search criteria. A third type of email includes a recommendation to apply to a job that a member has viewed or clicked recently. A fourth type of email includes a survey that asks if the member has submitted an offsite application to a job.

Each email produces an event that specifies, in context 230, the name of a channel associated with and/or responsible for jobs and/or other content in the email. On the other hand, channel names in events 216 for emails include non-standard and/or ad hoc names instead of standardized channel names associated with unified data logic 208. To improve the use of events 216 for job-related emails, processing apparatus 202 obtains a set of matching rules from unified data logic 208 and uses the matching rules to transform and/or map a nonstandard or ad hoc channel name in each event to a corresponding standardized channel name. For example, processing apparatus 202 applies regular expressions, term-based matching, and/or other types of text processing to the nonstandard channel name to identify a corresponding standardized channel name. In another example, processing apparatus 202 obtains mappings of nonstandard channel names to standardized channel names from the matching rules and uses the mappings to convert a nonstandard channel name in an event into the corresponding standardized channel name.

Third, unified data logic 208 and/or processing apparatus 202 include functionality to generate a value 220 for each action type 218 in events 216 with the same reference ID 210, job ID 212, member ID 214, and/or context 230 within a given window 206. In some embodiments, value 220 stores an aggregation that is specific to action type 218. For example, value 220 for a job serve action type 218 includes a Boolean value that indicates whether or not the job with job ID 212 was served to the member with member ID 214 within window 206. In another example, value 220 for a viewport display action type 218 includes a sum of durations (in milliseconds) of viewport displays of the job to the member within window 206. In a third example, value 220 for a save, unsave, dismiss, like, unlike, report, referral, onsite application click, offsite application click, and/or onsite application action type 218 includes a count of the action type in events 216 with a given reference ID 210, job ID 212, and member ID 214 in window 206. In a fourth example, value 220 for a view action type 218 includes the timestamp of the earliest action with the view action type 218 in window 206.

After processing apparatus 202 has validated, updated, transformed, and/or standardized fields in events 216 associated with a given reference ID 210, job ID 212, member ID 214, and window 206, an aggregation apparatus 204 generates a record 222 that unifies and/or standardizes data in events 216. As shown in FIG. 2, record 222 includes IDs 224, actions 226, and contexts 228. IDs 224 include reference ID 210, member ID 214, and job ID 212 values shared by events 216. Actions 226 include action types and/or the corresponding values. Contexts 228 include some or all fields in context 230 of each event.

An example record 222 generated by aggregation apparatus 204 includes the following representation:

```
Record 124:
{
    "referenceId" : "eRyA3MsHTkCf75msYcnITA",
    "jobId" : 7654321,
    "memberId" : {
        "int" : 1234567
    },
    "actions" : [ {
        "value" : {
            "long" : 6884
        },
        "type" : {
            "string" : "VIEWPORT"
        },
        "context" : {
            "deviceType" : {
                "string" : "PHONE"
            },
            "deviceModel" : {
                "string" : "Phone 3"
            },
            "agentString" : {
                "string" : "browserx (Phone3; CPU OS 10_5)"
            },
            "platform" : {
                "string" : "FLAGSHIP_APP"
            },
            "channel" : {
                "string" : "JYMBII"
            },
            "modulePosition" : null,
            "jobPosition" : {
                "int" : 0
            },
            "timestamp" : {
                "long" : 1555979238875
            },
        }
    }, {
        "value" : {
            "long" : 1
        },
        "type" : {
            "string" : "SERVE"
        },
        "context" : {
            "deviceType" : {
                "string" : "PHONE"
            },
            "deviceModel" : {
                "string" : "Phone 3"
            },
            agentString" : {
                "string" : "browserx (Phone3; CPU OS 10_5)"
            },
            "platform" : {
                "string" : "FLAGSHIP_APP"
            },
            "channel" : {
                "string" : "JYMBII"
            },
            "modulePosition" : null,
            "jobPosition" : {
                "int" : 0
            },
            "timestamp" : {
                "long" : 1555979232602
            },
        }
    } ]
}
```

The example record above includes a record ID of "124," which is followed by IDs 224 that include reference ID 210 of "eRyA3MsHTkCf75msYcnITA," job ID 212 of "7654321," and member ID 214 of "1234567." The example record also includes two actions 226. The first action includes a value of "VIEWPORT" for action type 218 and a value of "6884" for value 220. The second action includes a value of "SERVE" for action type 218 and a value of "1" for value 220. As a result, the example record indicates a viewport display of 6884 milliseconds for IDs 224 within a corresponding window 206, as well as serving of the job to the member within window 206.

The example record above also includes contexts 228 associated with actions 226. Each context is listed below action type 218 and value 220 for the corresponding action. Within contexts 228, both actions 226 have the same device type of "PHONE," device model of "PHONE 3," user agent string of "browserx (Phone3; CPU OS 10_5)," platform of "FLAGSHIP_APP," channel of "JYMBII," null module position, and job position of 0 (e.g., the first position in a ranking or list of jobs). The second action listed in the record has an earlier timestamp than the first action, indicating that the second action occurred before the first action (e.g., a job is served before the job is displayed in a viewport).

After record 222 is generated, aggregation apparatus 204 stores record 222 in data repository 134 and/or another data store. In turn, other components can query the data store for the record and use data in the record for machine learning, analytics, reporting, visualization, and/or other use cases. For example, the components assign positive labels to actions 226 representing positive responses by members to jobs (e.g., clicks, saves, likes, applications, etc.) and negative labels to actions 226 representing negative responses by members to jobs (e.g., dismisses, ignores, reports, etc.). The components use the labels and features associated with the members and jobs as training data for one or more machine learning models. In turn, the machine learning models learn to predict the members' responses to the jobs, given the corresponding features. The machine learning models are then applied to additional features for new member-job pairs to predict the members' likelihood of positively responding to the jobs, and job recommendations of jobs are outputted to members with high predicted likelihoods of responding positively to the jobs. Subsequent responses to the recommendations are, in turn, used to generate events 216 that are fed back into the system and used to generate additional unified records and/or update the machine learning models.

By aggregating events and/or logs of actions by common reference IDs, member IDs, and job IDs, the disclosed embodiments generate unified records that characterize and/or track the "histories" of actions between individual members and individual jobs across different channels, platforms, and/or times. The disclosed embodiments additionally include functionality to handle missing reference IDs in the events, which allows unified tracking or logging to be applied to corner cases and/or bugs that cause tracking issues in individual channels. The disclosed embodiments further use a unified data logic to generate and/or standardize fields in the unified records, which allows the unified records and/or actions in the records to be filtered and/or analyzed with respect to the fields.

Moreover, the unified records can be used to generate comprehensive training data for machine learning models that generate predictions or inferences related to the members and jobs. Because the machine learning models are created using feature sets that track the histories of interactions between members and jobs across channels and time, the machine learning models have higher performance than conventional machine learning models that are trained using limited and/or incomplete tracking data from individual channels and/or tracking systems. The disclosed embodiments additionally reduce manual overhead and/or resource (e.g., processor, memory, storage, etc.) consumption over conventional techniques that require manual aggregation of tracking or logging data into machine learning feature sets and/or multiple rounds of model training, testing, and/or validation using training data generated from different sets and/or combinations of events to achieve sufficient performance.

Consequently, the disclosed embodiments improve computer systems, applications, user experiences, tools, and/or technologies related to tracking, logging, user recommendations, analytics, feature engineering, machine learning, delivering content, hiring, employment, and/or job-seeking.

Those skilled in the art will appreciate that the system of FIG. 2 may be implemented in a variety of ways. First, processing apparatus 202, aggregation apparatus 204, and/or data repository 134 may be provided by a single physical machine, multiple computer systems, one or more virtual machines, a grid, a cluster, one or more databases, one or more filesystems, and/or a cloud computing system. Processing apparatus 202 and aggregation apparatus 204 may additionally be implemented together and/or separately by one or more hardware and/or software components and/or layers. "Online" instances of processing apparatus 202 and/or aggregation apparatus 204 can be used to perform real-time or near-real-time processing of events 216 (e.g., as events 216 are received over event streams 200), and "offline" instances of processing apparatus 202 and/or aggregation apparatus 204 can be used to perform batch or offline processing of events 216.

Second, the functionality of processing apparatus 202 and aggregation apparatus 204 may be adapted to other types of actions, data, and/or events. For example, the system may be used to unify and/or aggregate tracking events related to interactions with advertisements, posts, articles, recommendations, products, games, telemetry data, sensors, applications, hardware, instrumentation, or other sources of tracking or logging data.

Figure 3:
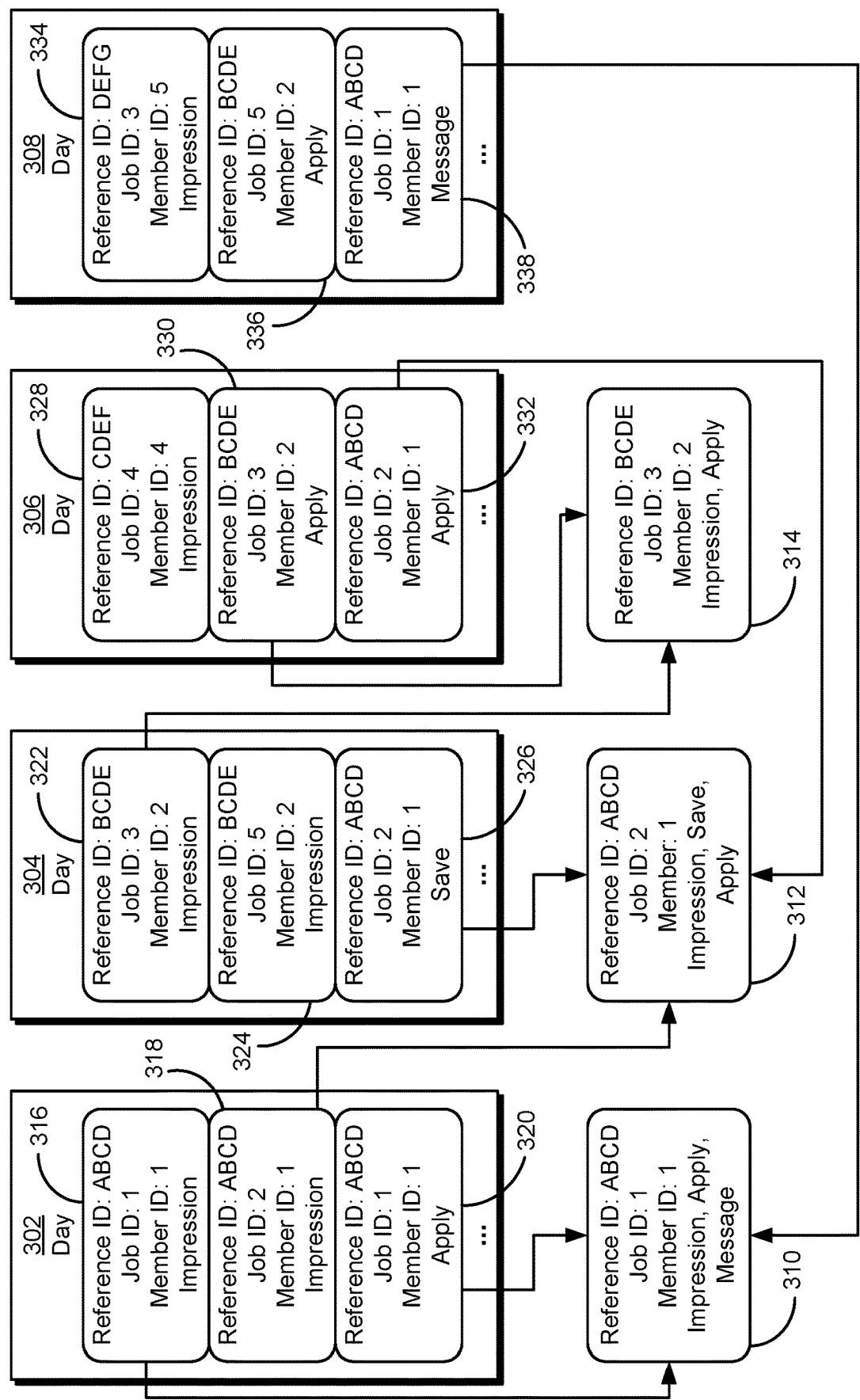
FIG. 3 shows the example aggregation of tracking events in accordance with the disclosed embodiments.

FIG. 3 shows the example aggregation of events 316-338 in accordance with the disclosed embodiments. As shown in FIG. 3, events 316-328 are generated over four consecutive days 302-308. The first day 302 includes a first tracking event 316 with a reference ID of "ABCD," a job ID of 1, a member ID of 1, and an action type of "Impression." Day 302 also includes a second tracking event 318 with a reference ID of "ABCD," a job ID of 2, a member ID of 1, and an action type of "Impression." Day 302 further includes a third tracking event 320 with a reference ID of "ABCD," a job ID of 1, a member ID of 1, and an action type of "Apply."

The second day 304 includes a first tracking event 322 with a reference ID of "BCDE," a job ID of 3, a member ID of 2, and an action type of "Impression." Day 304 also includes a second tracking event 324 with a reference ID of "BCDE," a job ID of 5, a member ID of 2, and an action type of "Impression." Day 304 further includes a third tracking event 326 with a reference ID of "ABCD," a job ID of 2, a member ID of 1, and an action type of "Save."

The third day 306 includes a first tracking event 328 with a reference ID of "CDEF," a job ID of 4, a member ID of 4, and an action type of "Impression." Day 306 also includes a second tracking event 330 with a reference ID of "BCDE," a job ID of 3, a member ID of 2, and an action type of "Apply." Day 306 further includes a third tracking event 332 with a reference ID of "ABCD," a job ID of 2, a member ID of 1, and an action type of "Apply."

The fourth day 308 includes a first tracking event 334 with a reference ID of "DEFG," a job ID of 3, a member ID of 5, and an action type of "Impression." Day 308 also includes a second tracking event 336 with a reference ID of "BCDE," a job ID of 5, a member ID of 2, and an action type of "Apply." Day 308 further includes a third tracking event 338 with a reference ID of "ABCD," a job ID of 1, a member ID of 1, and an action type of "Apply."

A portion of events 316-318 are aggregated into three records 310-314 based on a tracking window that spans days 302-308. In particular, record 310 includes a reference ID of "ABCD," a job ID of 1, and a member ID of 1. Record 310 also includes actions of "Impression," "Apply," and "Message" from tracking events 316, 320, and 338, which have the same reference ID, job ID, and member ID as record 310.

Record 312 includes a reference ID of "ABCD," a job ID of 2, and a member ID of 1. Record 312 includes actions of "Impression," "Save," and "Apply" from tracking events 318, 326, and 332, which have the same reference ID, job ID, and member ID as record 310.

Record 314 includes a reference ID of "BCDE," a job ID of 3, and a member ID of 2. Record 312 includes actions of "Impression" and "Apply" from tracking events 322 and 330, which have the same reference ID, job ID, and member ID as record 310. Because the first action in record 312 was performed on day 304, record 314 can also be updated with actions in tracking events with the same reference ID, job ID, and member ID generated the day after day 308.

As a result, records 310-314 represent centralized and/or unified "histories" of actions between members and jobs within the tracking window, independently of the channels, components, contexts, and/or times associated with the actions. In addition, records 310-314 adhere to a common schema, format, and/or set of standardized values, which allows data in records 310-314 to be used to generate features, labels, machine learning models, metrics, reports, visualizations, and/or other analysis or output.

Figure 4:
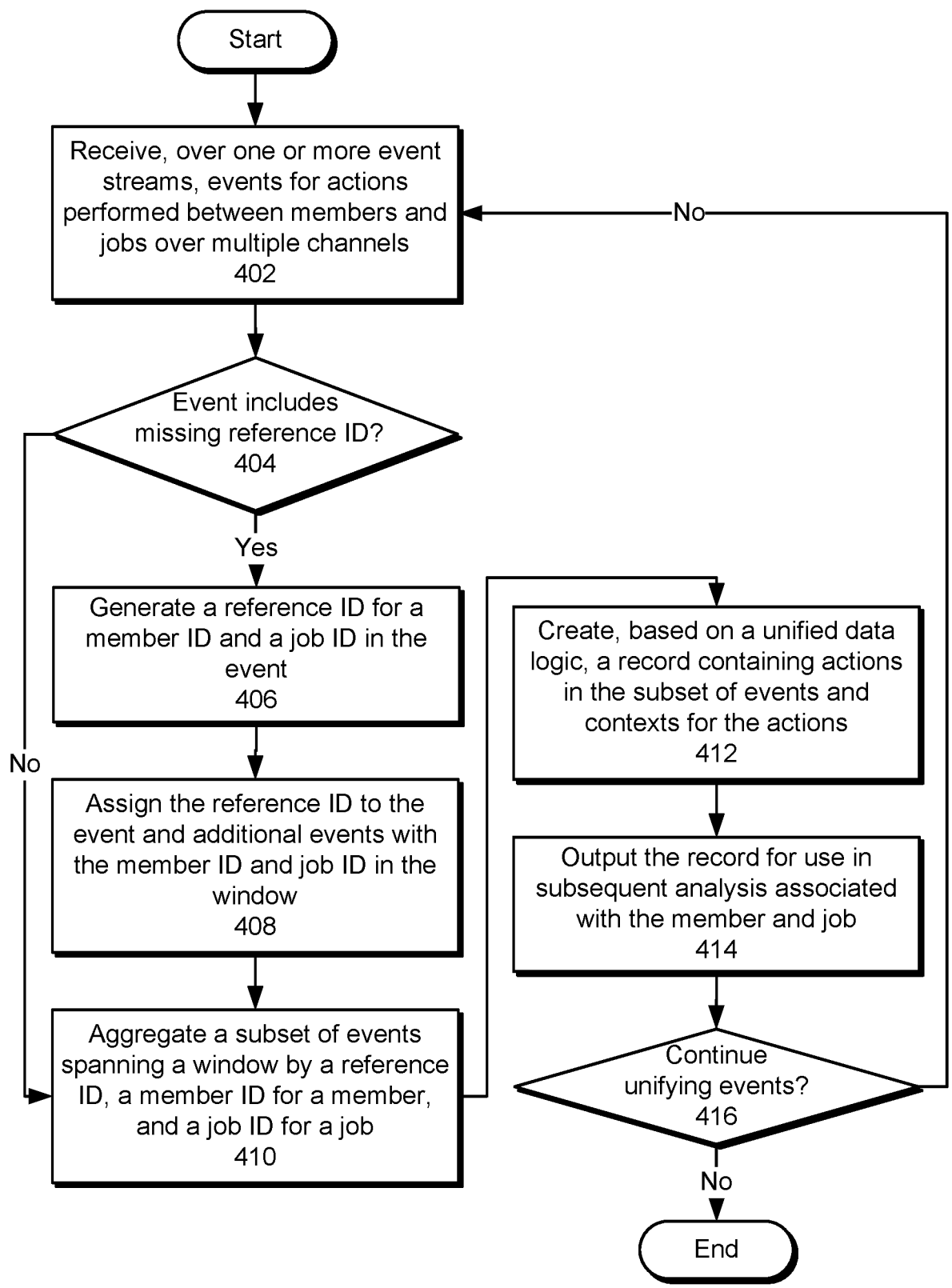
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, events for actions performed between members and jobs over multiple channels are received over one or more event streams (operation 402). For example, each event represents a log or record of a corresponding action. Each event is generated by a corresponding frontend or backend component of a channel that is used to deliver jobs to members and/or an API called by the component. The channel includes a content feed channel, job search channel, jobs home page channel, job detail channel, job recommendation channel, email channel, company page channel, and/ or notification channel. Each event includes a reference ID, job ID, member ID, action, and context of the action. The context includes a device type, device model, user agent, platform, channel, timestamp, and/or display context.

An event may be identified to include a missing reference ID (operation 404). For example, an event can include a missing or null reference ID if the component generating the event is buggy and/or the corresponding action was produced in a non-standard way (e.g., within a module or component that does not support tracking or logging of job-related actions).

If the event has a missing reference ID, a reference ID is generated for a member ID and job ID in the event (operation 406), and the reference ID is assigned to the event and additional events with the member ID and job ID in the window (operation 408). For example, the event includes an action representing an initial impression of a job by a member, after the member navigates to the job from a non-job-related channel or platform. A unique reference ID is generated and associated with the event for the action, as well as subsequent events that track or log actions with the same member ID and job ID. If an event does not have a missing reference ID, operations 406-408 are omitted.

After each event is verified to have a reference ID and/or a reference ID is added to the event, a subset of events spanning a window is aggregated by a reference ID, a member ID for a member, and a job ID for a job (operation 410). For example, the subset of events is identified to have the same reference ID, member ID, and job ID and timestamps that fall within a given tracking window, which starts at the earliest event and spans a number of days or weeks.

A record containing actions in the subset of events and contexts for the actions is created based on a unified data logic (operation 412). For example, the record includes the reference ID, member ID, and job ID shared by the events. The record also includes a list of actions; each action includes an action type, a value, and a context. The value is generated from an aggregation of an action type in the subset of events and can include a count, a duration, and/or a timestamp. During generation of the record, a non-standard channel name in an event is matched to a standardized channel name based on a set of matching rules. The standardized channel name is then added to a context for the corresponding action in the record.

After the record is generated, the record is outputted for use in subsequent analysis associated with the member and job (operation 414). For example, the record is stored in a data repository and subsequently used to generate training data for a machine learning model, metrics for assessing the performance of jobs, reports, visualizations, and/or other output.

Operations 402-414 may be repeated while unifying of events continues (operation 416). For example, events may be received over event streams (operation 402) and verified to have valid reference IDs (operations 404-408) before aggregating the events by reference ID, member ID, and job ID into records (operations 410-412) that are stored and/or outputted (operation 414) while jobs are delivered over multiple channels to members.

Figure 5:
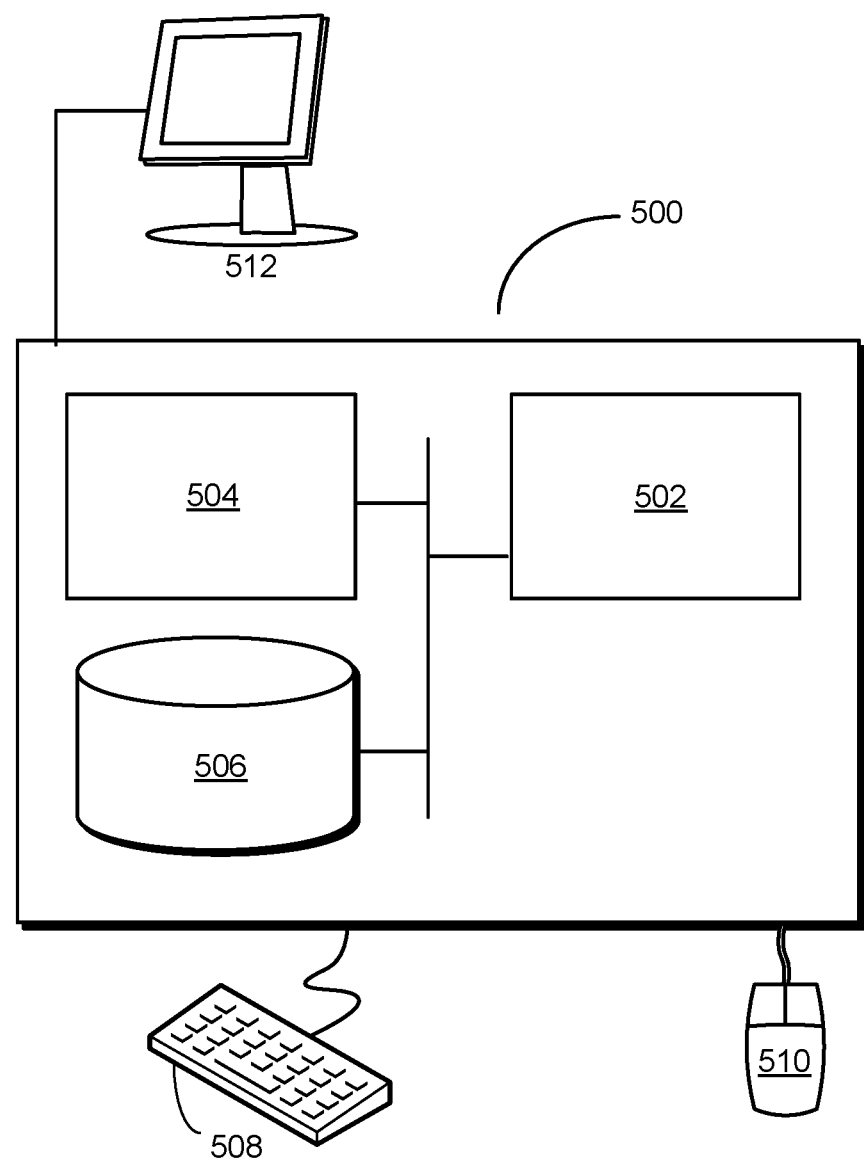
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for processing data. The system includes a processing apparatus and an aggregation apparatus, one or more of which may alternatively be termed or implemented as a module, mechanism, or other type of system component. The processing apparatus receives, over a set of event streams, a set of tracking or logging events for actions performed between members and jobs over multiple channels. Next, the processing apparatus and/or aggregation apparatus aggregate a subset of the events spanning a window by a reference ID generated based on a user session of a member, a first member ID for the member, and a first job ID for a job. The aggregation apparatus then creates, based on a unified data logic, a record containing a subset of the actions represented by the events and contexts for the subset of the actions. Finally, the aggregation apparatus outputs the record for use in subsequent analysis associated with the member and the job.

In addition, one or more components of computer system 500 may be remotely located and connected to the other components over a network. Portions of the present embodiments (e.g., processing apparatus, aggregation apparatus, data repository, online network, etc.) may also be located on different nodes of a distributed system that implements the embodiments. For example, the present embodiments may be implemented using a cloud computing system that generates records containing unified tracking data for actions between a set of remote users and a set of jobs.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   receiving, by one or more computer systems over one or more event streams, a set of logging events for actions performed between members and jobs over multiple channels;
   aggregating, by the one or more computer systems, a subset of the logging events spanning a logging window by a reference identifier (ID) generated based on period of interaction with a member, a first member ID for the member, and a first job ID for a job;
   creating, by the one or more computer systems based on a unified data logic, a record comprising a subset of the actions represented by the logging events and contexts for the subset of the actions; and
   outputting the record for use in subsequent analysis associated with the member and the job.

2. The method of claim 1, further comprising:
   identifying, in the set of logging events, a logging event with a missing reference ID;
   generating a second reference ID for a second member ID and a second job ID in the logging event; and
   assigning second the reference ID to the logging event and additional logging events with the second member ID and the second job ID in the logging window.

3. The method of claim 1, wherein aggregating the subset of logging events spanning the logging window comprises:
   aggregating the subset of logging events with timestamps that fall within the logging window.

4. The method of claim 1, wherein creating the record comprising the subset of the actions and context for the subset of the actions comprises:
   obtaining a channel name associated with an action from a logging event for the action;
   matching the channel name to a standardized channel name based on a set of matching rules; and
   adding the standardized channel name to a context for the action in the record.

5. The method of claim 1, wherein creating the record comprising the subset of the actions and contexts for the subset of the actions comprises:
   generating a value based on an aggregation of an action type in the subset of logging events; and
   storing the action type and the value in the record.

6. The method of claim 5, wherein the value comprises at least one of:
   a count;
   a duration; and
   a timestamp.

7. The method of claim 5, wherein the action type comprises at least one of:
   a serve;
   a viewport display;
   a view;
   a save;
   an unsave;
   a report;
   a share;
   a dismiss;
   a referral request;
   a like;
   an unlike;
   a click on an onsite job application;
   a click on an offsite job application; and
   an application.

8. The method of claim 1, wherein each logging event in the subset of logging events comprises:
   the reference ID;
   the job ID;
   the member ID;
   an action; and
   a context of the action.

9. The method of claim 8, wherein the context comprises at least one of:
   a device type;
   a device model;
   a user agent;
   a platform;
   a channel;
   a timestamp; and
   a display context.

10. The method of claim 1, wherein the multiple channels comprise at least one of:
    a content feed channel;
    a job search channel;
    a jobs home page channel;
    a job detail channel;
    a job recommendation channel;
    an email channel;
    a company page channel; and
    a notification channel.

11. The method of claim 1, wherein the reference ID is generated in response to a first action between the member and the job and assigned to subsequent actions between the member and the job in the logging window after the first action.

12. A system, comprising:
    one or more processors; and
    memory storing instructions that, when executed by the one or more processors, cause the system to:
       receive, over one or more event streams, a set of logging events for actions performed between members and jobs over multiple channels;
       aggregate a subset of the logging events spanning a logging window by a reference identifier (ID) generated based on a user session of a member, a first member ID for the member, and a first job ID for a job;
       create, based on a unified data logic, a record comprising a subset of the actions in the logging events and contexts for the subset of the actions; and output the record for use in subsequent analysis associated with the member and the job.

13. The system of claim 12, wherein the memory further stores instructions that, when executed by the one or more processors, cause the system to:
   identify, in the set of logging events, a logging event with a missing reference ID;
   generate a second reference ID for a second member ID and a second job ID in the logging event; and
   assign the second reference ID to the logging event and additional logging events with the second member ID and the second job ID in the logging window.

14. The system of claim 12, wherein creating the record comprising the subset of the actions and context for the subset of the actions comprises:
   obtaining a channel name associated with an action from a logging event for the action;
   matching the channel name to a standardized channel name based on a set of matching rules; and
   adding the standardized channel name to a context for the action in the record.

15. The system of claim 12, wherein creating the record comprising the subset of the actions and contexts for the subset of the actions comprises:
   generating a value based on an aggregation of an action type in the subset of logging events; and
   storing the action type and the value in the record.

16. The system of claim 15, wherein the value comprises at least one of:
   a count;
   a duration; and
   a timestamp.

17. The system of claim 15, wherein the action type comprises at least one of:
   a serve;
   a viewport display;
   a view;
   a save;
   an unsave;
   a report;
   a share;
   a dismiss;
   a referral request;
   a like;
   an unlike;
   a click on an onsite job application;
   a click on an offsite job application; and
   an application.

18. The system of claim 12, wherein each logging event in the subset of logging events comprises:
   the reference ID;
   the job ID;
   the member ID;
   an action; and
   a context of the action.

19. The system of claim 12, wherein the contexts comprise at least one of:
   a device type;
   a device model;
   a user agent;
   a platform;
   a channel;
   a timestamp; and
   a display context.

20. A non-transitory computer-readable storage medium storing instructions that when executed by a computer cause the computer to perform a method, the method comprising:
   receiving, over one or more event streams, a set of logging events for actions performed between members and jobs over multiple channels;
   aggregating a subset of the logging events spanning a logging window by a reference identifier (ID) generated based on a user session of a member, a first member ID for the member, and a first job ID for a job;
   creating, based on a unified data logic, a record comprising a subset of the actions represented by the logging events and contexts for the subset of the actions; and
   outputting the record for use in subsequent analysis associated with the member and the job.

* * * * *